United States Patent [19]

Cho et al.

[11] Patent Number: 5,287,185
[45] Date of Patent: Feb. 15, 1994

[54] METHOD OF CORRECTING TRANSMISSION ERROR IN DIGITAL COLOR-TELEVISION COMMUNICATION SYSTEM AND DIGITAL COLOR-TELEVISION COMMUNICATION SYSTEM TO WORK SAID METHOD

[75] Inventors: Fujio Cho; Shinji Koike, both of Tokyo, Japan

[73] Assignee: Nec Corporation, Tokyo, Japan

[21] Appl. No.: 845,340

[22] Filed: Mar. 4, 1992

[30] Foreign Application Priority Data

Mar. 14, 1991 [JP] Japan .................................. 3-73721

[51] Int. Cl.$^5$ .......................................... H04N 5/213
[52] U.S. Cl. ...................................... 348/624; 371/31
[58] Field of Search .............. 358/10, 139, 21 R, 36, 358/167, 336, 163, 141; 371/31; H04N 5/213

[56] References Cited

U.S. PATENT DOCUMENTS

| | | | |
|---|---|---|---|
| 4,519,001 | 5/1985 | Morrison | 371/31 X |
| 4,641,309 | 2/1987 | Nakano | 371/31 |
| 4,680,658 | 7/1987 | Tatami | 358/336 X |
| 4,686,583 | 8/1987 | Tomita et al. | 358/336 |
| 4,792,953 | 12/1988 | Pasdera et al. | 358/336 X |
| 5,148,291 | 9/1992 | Kimura et al. | 358/336 |

Primary Examiner—Victor R. Kostak
Attorney, Agent, or Firm—Whitham & Marhoefer

[57] ABSTRACT

A method of correcting digital NTSC color-television signals in transmission error by substituting the error-included digital color-television signals with those digital color-television signals in the corresponding horizontal scanning periods two frame periods before, stored in memory (12), and an apparatus to work the method. When a transmission error is detected in a specific horizontal scanning period, substitute circuit (13) reads from memory (12) the digital color-television signals in the N horizontal scanning periods two frame periods before corresponding to the specific and subsequent N-1 horizontal scanning periods, and transmits the digital color-television signals read from memory (12) in lieu of those digital color-television signals in the specific and subsequent N-1 horizontal scanning periods.

6 Claims, 1 Drawing Sheet

METHOD OF CORRECTING TRANSMISSION ERROR IN DIGITAL COLOR-TELEVISION COMMUNICATION SYSTEM AND DIGITAL COLOR-TELEVISION COMMUNICATION SYSTEM TO WORK SAID METHOD

BACKGROUND OF THE INVENTION

1. Field of the Invention

The present invention relates to a digital communication system for a NTSC color-television signal, and in particular to a method of detecting and correcting a parity error and to a circuit to work the method.

2. Description of the Related Art

In the communication system for transmitting an analog color-television signal by means of digital transmission, the analog color-television signal is, as is well known, converted to a digital color-television signal, coded and multiplexed in the transmitter in order to transmit the coded digital color-television signal by means of time division multiplexing. For time division multiplexing transmission, it is usual to take a horizontal scanning period as a transmission frame. Hereafter a digital color-television signal will be referred to as a digital signal. The transmitted coded digital signal is received by the receiver, where the signal is demultiplexed, decoded and converted to an analog color-television signal.

When it is required to detect a transmission error, a first parity is generated from the coded digital signal in the transmitter and inserted into the transmission frame as a parity bit in order to be transmitted along with the coded digital signal. The first parity is separated in the receiver from the coded digital signal at the demultiplexing stage, and collated with a second parity generated from the separated coded digital signal. If a transmission error takes place in the coded digital signal, it causes the second parity to be different from the first parity. In this way, occurrence of a transmission error is judged from the parity check.

In order to correct the transmission error or a parity error occurring on the transmission line, the typical method has been to substitute the digital signal (provided by decoding the coded digital signal) in a horizontal scanning period in which a transmission error has occurred (hereafter referred to as the present horizontal scanning period), with the digital signal in the preceding horizontal scanning period in the same frame period. In order to work this method, a substitute circuit controlled by the parity check signal is provided in the receiver. The substitute circuit has a buffer memory for storing a digital signal in the last at least one horizontal scanning period. When the parity check signal is active, indicating that the second parity is different from the first parity, the substitute circuit, in lieu of the digital signal in the present horizontal scanning period, delivers the digital signal in the preceding (i.e. the last) horizontal scanning period in the same frame period. In this way, the disturbance in a color-television picture due to transmission error is made indistinguishable.

A problem encounterd in the method described above has been that, since a digital signal in error in the present horizontal scanning period is substituted with the digital signal in the preceding horizontal scanning period, when the transmission error lasts for two or more, for example N horizontal scanning periods (N is a positive integer), the error-included digital signal in the present horizontal scanning period will be substituted for an digital signal in error in the next horizontal scanning period, which causes a disturbance in the color-television picture such as a distinct horizontal streak.

This disadvantage may be avoided by substituting a block of the digital signals in N horizontal scanning periods including the horizontal scanning period in which the transmission error occurs, with a block of the digital signals in the preceding N horizontal scanning periods. While by this block-for-block substitution the disturbance is avoided, it causes another problem that the color-television picture becomes unnatural, because a part of the color-television picture is repeated in the following part of the same picture frame.

SUMMARY OF THE INVENTION

It is an object of the present invention to provide a method of correcting a transmission error so that neither the disturbance nor unnatural color appears in the color-television picture.

It is another object of the present invention to provide a color-television communication system to work the above method.

In order to achieve the above first object, the method of correcting a transmission error in a color-television communication system according to the present invention includes steps of supplying the digital color-television signal transmitted from the transmitter, to a memory provided in the receiver and storing the digital color-television signals in the last at least two frame periods; and when a transmission error is detected in the digital color-television signal in the present horizontal scanning period, reading first signals from the memory, the first signals being the digital color-television signals in the N horizontal scanning periods two frame periods before, wherein the N horizontal scanning periods correspond to the present and subsequent N-1 horizontal scanning periods in the present frame period, and N is a predetermined positive integer including 1; converting the first signals to analog color-television signals in lieu of second signals which are the digital color-television signals in the present and subsequent N-1 horizontal scanning periods; and storing the first signals in the memory in lieu of the second signals.

Since the scanning phase coincides in every two frame periods in the NTSC color-television system, the digital color-television signals in the present and subsequent N-1 horizontal scanning periods are substituted with those in the corresponding N horizontal scanning periods not in the preceding frame period but two frame periods before.

When the color-television communication system is in a communication circumstance where a random error is liable to occur, N is preferably taken to be 1. Where a burst error is liable to occur, N is preferably taken to be the most probable burst-error length expressed in terms of the horizontal scanning period taken as a unit.

In order to achieve the second object above, a color-television communication system according to the present invention includes a memory which is supplied with the digital color-television signal transmitted from the transmitter and which stores the digital color-television signals in the last at least two frame periods; and substitute means which, when the transmission error is not detected, transmits the supplied digital color-television signal to a D/A converter, and when a transmission error is detected in the digital color-television signal in the present horizontal scanning period, reads first signals from the memory, the first signals being the digital color-television signals in the N horizontal scanning periods two frame periods before, wherein the N horizontal scanning periods correspond to the present and subsequent N-1 horizontal scanning periods in the present frame period, and N is a predetermined positive integer including 1; delivers the first signals to the D/A converter in lieu of second signals which are the digital color-television signals in the present and subsequent N-1 horizontal scanning periods; and controls the memory to store the first signals in lieu of the second signals.

The above and other objects, features and advantages of the present invention will become apparent from the following description referring to the accompanying drawing which illustrates an example of a preferred embodiment of the present invention.

DETAILED DESCRIPTION OF THE PREFERRED EMBODIMENT

Figure 1:
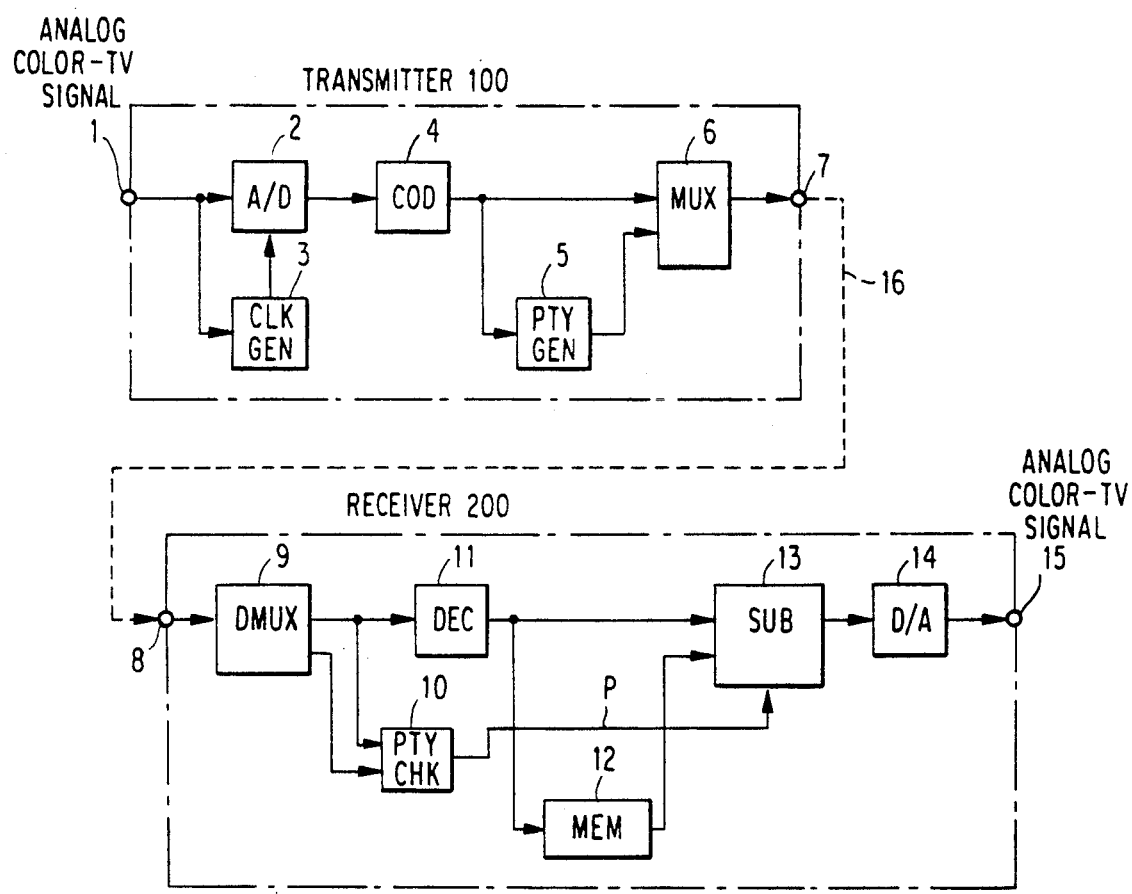
FIG. 1 is a block diagram of the color-television communication system according to the present invention.

Referring now to a drawing, a detailed explanation of the preferred embodiment will be given below.

FIG. 1 shows a color-television communication system according to the present invention.

The system comprises transmitter 100, receiver 200 and transmission line 16. Transmitter 100 comprises A/D converter 2, clock generator 3, coder 4, parity generator 5 and multiplexer 6. A/D converter 2 converts to a digital signal an analog color-television signal externally supplied through input terminal 1. Clock generator 3 generates sampling frequency for A/D converter 2 in synchronization with the horizontal scanning signal or the color burst signal. Coder 4 encodes the digital signal to provide a coded digital signal. Parity generator 5 generates a first parity from the coded digital signal. Multiplexer 6 transmits the coded digital signal together with the first parity to receiver 200 by means of time division multiplexing with every horizontal scanning period as a transmission frame. Receiver 200 comprises demultiplexer 9, parity check circuit 10, decoder 11, memory 12, substitute circuit 13 and D/A converter 14. Demultiplexer 9 separates the transmission frame assigned to receiver 200 from the multiplexed signal transmitted through terminal 8. Demultiplexer 9 further separates the first parity from the coded digital signal in the demultiplexed transmission frame. Parity check circuit 10 generates a second parity from the coded digital signal and collates the second parity with the first parity to provide a parity check signal. Decoder 11 decodes the coded digital signal to provide a digital signal (a digital color-television signal). Memory 12 stores the digital signals in the last two frame periods (the last 2×525 horizontal scanning periods). Substitute circuit 13 transmits the digital signal supplied from decoder 11 to D/A converter 14 when the parity check signal P is inactive, indicating that a transmission error did not occur. Substitute circuit 13 also reads desired digital signals stored in memory 12 and transmits the desired digital signals to D/A converter 14 in lieu of the digital signals delivered from decoder 11, when parity check signal P is active.

In operation, when a transmission error is detected in the digital color-television signal in the present horizontal scanning period, substitute circuit 13 reads first signals from memory 12. Here, the first signals are the digital color-television signals in the N horizontal scanning periods two frame periods before, wherein the N horizontal scanning periods are those periods which correspond to the present and subsequent N-1 horizontal scanning periods in the present frame period, and N is a predetermined positive integer including 1. Substitute circuit 13 next delivers the first signals to D/A converter 14 in lieu of second signals. Here, the second signals are the digital color-television signals in the present and subsequent N-1 horizontal scanning periods. Substitute circuit 13 subsequently controls memory 12 to store the first signals in lieu of the second signals in order to prepare for correcting a later transmission error.

Positive integer N is determined so that, when a random error is liable to occur in the transmission line, N=1, and, when a burst error is liable to occur, N is equal to the most probable burst-error length expressed in terms of the horizontal scanning period taken as a unit.

In this way, a part of a color-television picture in error is replaced with the same part of the picture frame two frame periods before, whereby an unnatural color in a color-television picture due to a transmission error is avoided even when a burst error occurs, unless the color change in 1/30 second is so rapid as to be conspicuous.

It is to be understood, however, that even though the characteristics and advantages of the present invention have been set forth in the foregoing description, the disclosure is illustrative only, and changes may be made within the scope of the appended claims.

What is claimed is:

1. A method of correcting a transmission error in a color-television communication system provided with error detecting means, the system having a transmitter for converting an externally supplied analog color-television signal to a digital color-television signal and transmitting it by means of digital communication and a receiver for receiving the digital color-television signal to convert it to an analog color-television signal, the method comprising steps of supplying the digital color-television signal transmitted from the transmitter to a memory provided in the receiver and storing the digital color-television signals in the last at least two frame periods, when a transmission error is detected in the digital color-television signal in the present horizontal scanning period, reading first signals from the memory, the first signals being the digital color-television signals in the N horizontal scanning periods two frame periods before, wherein the N horizontal scanning periods correspond to the present and subsequent N-1 horizontal scanning periods in the present frame period, and N is a predetermined positive integer including 1; converting the first signals to analog color-television signals in lieu of second signals which are the digital color-television signals in the present and subsequent N-1 horizontal scanning periods; and storing the first signals in the memory in lieu of the second signals.

2. A method as claimed in claim 1, wherein N is equal to 1.

3. A method as claimed in claim 1, wherein N is equal to the most probable burst-error length expressed in terms of the horizontal scanning period taken as a unit.

4. A color-television communication system provided with means for detecting a transmission error, the system having both a transmitter for converting an externally supplied analog color-television signal to a digital color-television signal and transmitting it by means of digital communication, and a receiver for receiving the digital color-television signal and converting the digital color-television signal to an analog color-television signal by means of a D/A converter, wherein the receiver includes a memory which is supplied with the digital color-television signal transmitted from the transmitter and which stores the digital color-television signals in the last at least two frame periods, and substitute means which, when the transmission error is not detected, transmits the supplied digital color-television signal to the D/A converter, and when a transmission error is detected in the digital color-television signal in the present horizontal scanning period, reads first signals from the memory, the first signals being the digital color-television signals in the N horizontal scanning periods two frame periods before, wherein the N horizontal scanning periods correspond to the present and subsequent N-1 horizontal scanning periods in the present frame period, and N is a predetermined positive integer including 1; delivers the first signals to the D/A converter in lieu of second signals which are the digital color-television signals in the present and subsequent N-1 horizontal scanning periods; the memory to store the first signals in lieu of the second signals.

5. A color-television communication system as claimed in claim 4, wherein N is equal to 1.

6. A color-television communication system as claimed in claim 4, wherein N is equal to the most probable burst-error length expressed in terms of the horizontal scanning period taken as a unit.

* * * * *